United States Patent [19]
Gormish et al.

[11] Patent Number: 5,337,362
[45] Date of Patent: Aug. 9, 1994

[54] METHOD AND APPARATUS FOR PLACING DATA ONTO PLAIN PAPER

[75] Inventors: Michael J. Gormish, Stanford; Mark Peairs, Menlo Park; David G. Stork, Stanford, all of Calif.

[73] Assignees: Ricoh Corporation, Menlo Park, Calif.; Ricoh Company Ltd., Tokyo, Japan

[21] Appl. No.: 48,376

[22] Filed: Apr. 15, 1993

[51] Int. Cl.⁵ .............................................. G09C 5/00
[52] U.S. Cl. ........................................ 380/54; 380/30
[58] Field of Search ........................ 380/29, 30, 46, 51, 380/54, 55, 59; 235/494

[56] References Cited

U.S. PATENT DOCUMENTS

| | | |
|---|---|---|
| 4,782,221 | 11/1988 | Brass et al. |
| 4,853,961 | 8/1989 | Pastor .................... 380/30 X |
| 4,939,354 | 7/1990 | Priddy et al. .............. 235/496 X |
| 5,113,445 | 5/1992 | Wang . |
| 5,170,044 | 12/1992 | Pastor ..................... 235/496 X |

FOREIGN PATENT DOCUMENTS

| | | |
|---|---|---|
| 0469864 | 7/1991 | European Pat. Off. . |
| 0493053 | 12/1991 | European Pat. Off. . |
| 0493091 | 12/1991 | European Pat. Off. . |

*Primary Examiner*—Tod R. Swann
*Attorney, Agent, or Firm*—Blakely, Sokoloff, Taylor & Zafman

[57] ABSTRACT

A method and apparatus for placing digital data on plain paper. One embodiment of the present invention allows for the digital data to undergo encryption before being placed on the plain paper. In one embodiment, a photocopier is used for transferring digital encrypted data to and from a plain piece of paper. The photocopier allows digital data to be stored onto plain paper after encryption, such that the digital data is secure. The photocopier also includes a device to recognize the encrypted digitized pixels on the page such that they may be decrypted and the original image reproduced.

37 Claims, 9 Drawing Sheets

FIG_1 ENCODING PROCESS

FIG_2

FIG_3

FIG_4  DECODING PROCESS

FIG_8  ENCODING PROCESS

FIG_9  DECODING PROCESS

METHOD AND APPARATUS FOR PLACING DATA ONTO PLAIN PAPER

FIELD OF THE INVENTION

This invention relates to the field of digital communications; particularly, the present invention relates to digital communications on plain paper.

BACKGROUND OF THE INVENTION

Today, the most common practice of recording and transferring information is through the use of plain paper. One of the most widely recognized methods of recording information on plain paper is through the use of a photocopier. A photocopier scans an image, possibly performs some processing on the image and then reproduces the scanned image onto a piece of plain paper.

Until recently, prior art copiers mainly operated using analog signals. In other words, the operations of scanning the image, processing the image and then reproducing the image were all performed in analog. More recently, many functions of the copier have been performed in the digital arena. However, in either the analog or digital case, the function of the photocopier remains the reproduction of an original image onto a piece of plain paper.

The change from analog-to-digital signals in photocopiers allows several new operations to be performed. One new operation that may be performed is the encryption of information. Encryption is a technique whereby data may be stored in a format such that the data cannot be deciphered easily. In other words, encryption provides a mechanism for encoding data. There are numerous techniques in the prior art for encryption. However, all of these prior art techniques require that the data be digital. In the prior art, some copiers have been able to rearrange the information on the page in an attempt to provide encryption. One problem with providing encryption through simply rearranging the data on the page is that it isn't very secure. It would be advantageous to use a photocopier to perform encryption of digital data into plain paper such that it is secure.

In the prior art, some limited methods for storing digital information on plain paper have been set forth. One example of digital information being stored on paper is the use of bar codes. Bar codes are single dimension digital data in which typically ten digits of information are placed on a paper horizontally to store information. By scanning the bar codes in a relatively horizontal direction, the information encoded into the bar codes may be read. These scans usually occur very quickly. Note that the greater the height of the bar code (in the vertical direction), the less horizontal the scan is required to be to obtain the information. Also note that because bar codes are horizontal, there is an inherent limit to the number of bar codes which may be used to store digital information on a piece of paper. For more information on bar codes, see "Information Encoding with Two-Dimensional Bar Codes," authored by T. Pavlidis, J. Swartz and Y. Wang, COMPUTER, June 1992. See also U.S. Pat. No. 5,113,445 disclosing the placement of bar codes onto paper. It is desirable to store more digital information on a piece of plain paper than by using bar codes.

The present invention provides a method and apparatus for placing data on plain paper. In one embodiment, digital data is placed onto plain paper with a digital photocopier. The present invention also provides a method and apparatus for encrypting digital data such that the data remains secure upon reading the plain paper.

SUMMARY OF THE INVENTION

A method and apparatus for transferring digital information to and from plain paper is described. The present invention involves storing data in at least one box on plain paper. Each box includes a frame or border. Binary data is formatted in rows within the box, wherein a bit of digital data is depicted by the presence or absence of an ink dot. The inside edges of the left and right sides of the box have markers for identifying the vertical separations (i.e., the rows) between the digital data.

In one embodiment, the method and apparatus comprises a reproduction system having an encryption device for performing encryption on a data source to produce encrypted data. The present invention also includes an encoder for encoding the encrypted data into a series of pixel values. These pixel values are then output by a printing device, such that the data is placed in multiple boxes having a frame and a plurality of rows and columns on a piece of plain paper, such that the data source is represented in encrypted digitized form on the plain paper.

In the present invention, the reproduction system also includes a method and apparatus for recognizing the data on the plain paper. The method and apparatus for recognizing the data includes a scanning device for scanning the boxes on the plain paper and for converting the pixels into electrical signals representative of the characters. The present invention also includes a decoder for decoding the electrical signals into output signals representative of the data. A decryption device then performs decryption on the decoded data. An output device then transfers the decrypted data onto a piece of plain paper.

BRIEF DESCRIPTION OF THE DRAWINGS

The present invention will be understood more fully from the detailed description given below and from the accompanying drawings of the preferred embodiments of the invention which, however, should not be taken to limit the invention to the specific embodiments, but are for explanation and understanding only.

DETAILED DESCRIPTION OF THE INVENTION

A method and apparatus for placing digital data onto plain paper is described. In the following description, numerous specific details are set forth such as processing steps, numbers of boxes, compression and encryption techniques, etc., in order to provide a thorough understanding of the present invention. It will be obvious, however, to one skilled in the art that the present invention may be practiced without these specific details. In other instances, well-known operations have not been described in detail to avoid unnecessarily obscuring the present invention.

Overview of the Encoding Process of the Present Invention

Figure 1:
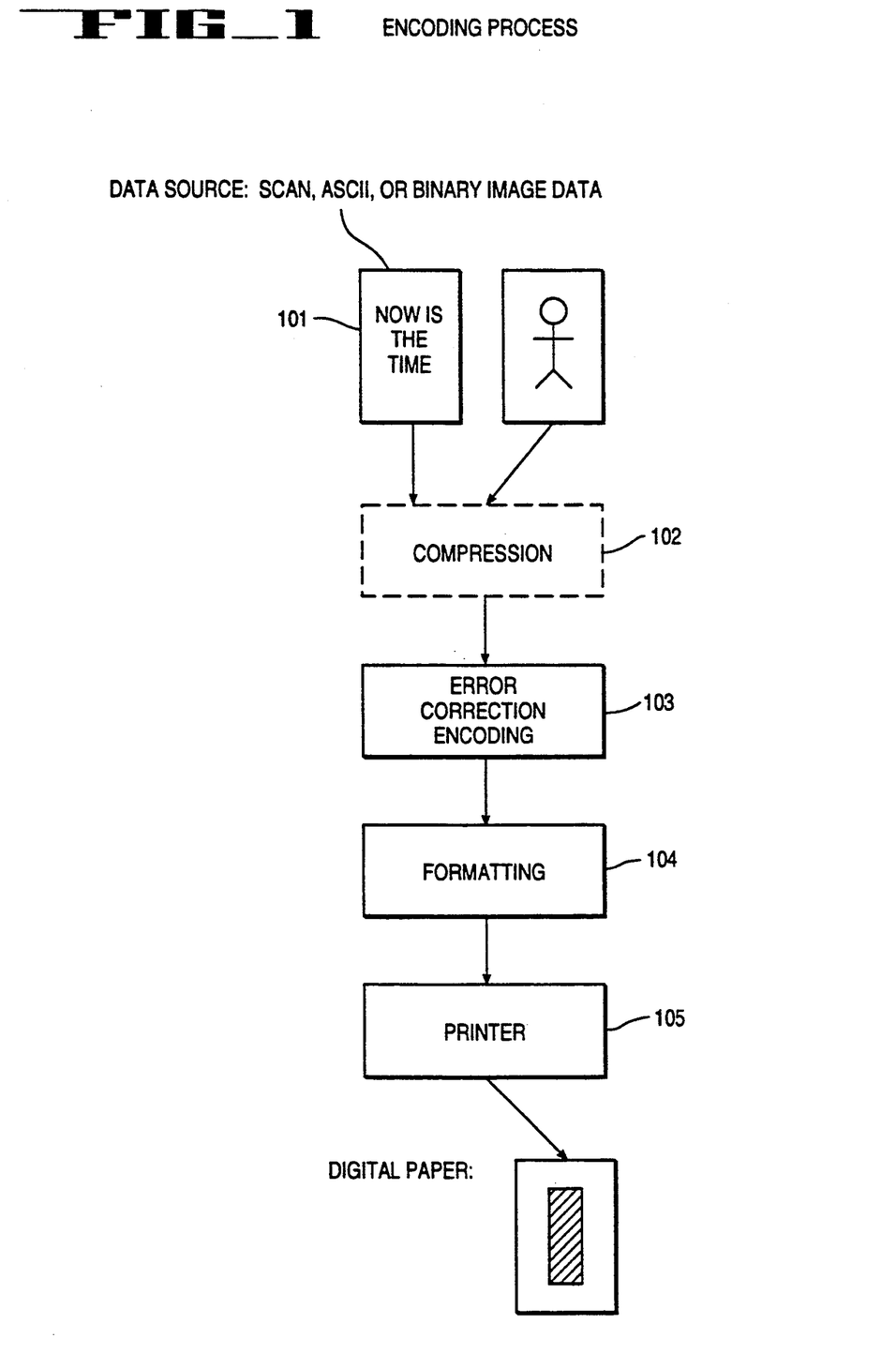
FIG. 1 is a block diagram of one embodiment of the encoding process of the present invention.

FIG. 1 illustrates the encoding process of the present invention. The encoding process produces a sheet of paper which stores digital information. Thus, the result of the encoding process of the present invention is "digital" paper.

Referring to FIG. 1, in the present invention, data source 101 comprises digital data. In one embodiment, data source 101 is derived from a source of data that is scanned by a scanning device. In one embodiment, the scanning device is the scanner portion of a photocopier. Thus, in this embodiment, the data source 101 is a scan of paper on the photocopier glass. Note that in the currently preferred embodiment, the scan of the paper comprises digital data. Note also that the compression performed on the data has been signified in FIG. 1 by compression processing 102. In other embodiments, data source 101 could come from an ASCII data file, a JPEG compressed color image or even a binary executable file. In other words, the data source 101 of the present invention can come from any source, including text, fax data, gray scale or even color image data. It should be noted that in the present invention, compression may or may not be performed. If compression is performed, various forms may be utilized, including both lossy and lossless compression techniques depending on whether the compressed data must be recreated in the exact form as the original.

Once the data source 101 is in digital form and any desired compression has taken place (processing block 102), error correction encoding may be performed (processing block 103). Since the plain paper is used as a digital channel, the error correction of the present invention can be viewed as just another box with digital input and digital output. Error correction encoding (processing block 103) comprises adding correction or "parity" bits to the digital information of the encrypted data source 101. In one embodiment, the error correction is performed using software. The software used to perform error correction is a shortened-interleaved Reed-Solomon code over GF (256) to provide the forward error correction. In the Reed-Solomon code over GF (256), one byte of data is taken from each box and combined using additions and multiplications in a finite field to produce two checksum bytes. In one embodiment, these bytes are encoded in the final two boxes on the page. For more information on Reed-Solomon Coding including the terms "shortened" and "interleaved", see Richard E. Blahut, *Theory and Practice of Error Control Codes*, Addison-Wesley, 1983.

As will be described below, in one embodiment, the data is stored on the plain paper in several boxes spread out on the page. The error correction code is interleaved by an amount equal to the number of bytes stored in one box on the page. It is therefore possible to lose an entire box without any uncorrectable errors. In this embodiment, one byte from each of the first ten boxes is used to compute the parity bits which are stored in the final two boxes. Note that in the present invention the boxes with the parity bits are no different than the other boxes of digital data on the plain paper. One parity box can be lost and the entire message can still be constructed just as for the data boxes. In one embodiment, twelve boxes of data are used for data storage on the paper.

Note that there is an advantage to using information about the formatter to select the parameters the error correction. That is, since error correction can group any set of bytes together, if the location of the bytes on the page is known, then bytes used in the error corrections may be those which are separated on the page. In this manner, error correction results which can better handle situations where a large portion of the plain paper has sustained damage (for instance, such as the damage due to a coffee spill). In addition, parameters can be chosen based on the decoder. Thus, if a very high resolution scanner is used in decoding, then the coder could attempt to transmit more data. If the scanner has a large platen, then more information can be decoded (all other things being equal). If it is known that the particular receiver is highly noisy, then a more robust error correction method could be used.

Once the data source 101 is in digital form, any desired compression has occurred (processing block 102), and any desired error correction encoding has been performed (processing block 103), the digital data is formatted into distinct colored pixels (processing block 104) which can be printed. In one embodiment, the digital data is formatted into black and white pixels. In one embodiment, the pixels are printed by the printer portion of the photocopier.

The formatting step of the present invention (processing block 104) is responsible for changing a digital bit sequence into a form which can be accurately scanned and a format which is readable by the printer. In one embodiment, the formatter produces a Postscript ™ file which can be printed on a laser printer.

After formatting (processing block 104), the data is printed (processing block 105). In one embodiment, where the formatting process produces a Postscript file describing the page of the formatted data, the Postscript file is then printed on a high quality Postscript printer, such as the LaserWriter IINT brand printer of Apple Corporation of Cupertino, Calif.

Figure 2:
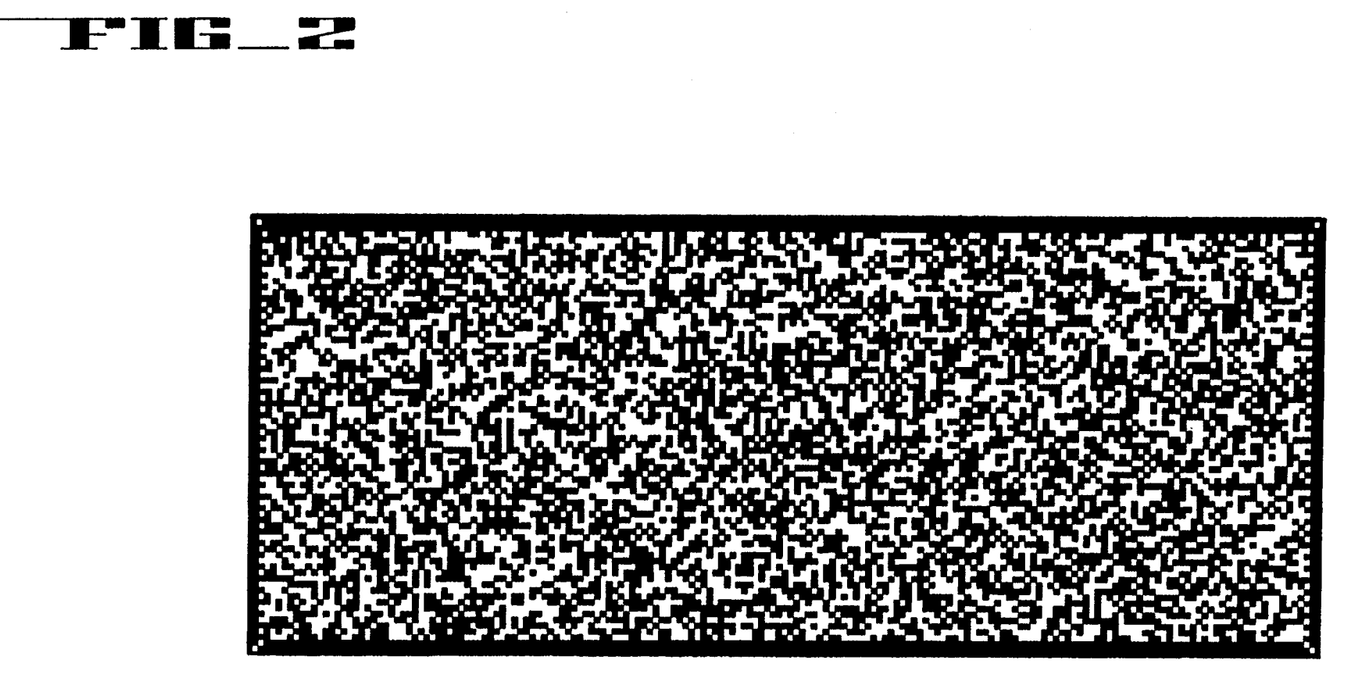
FIG. 2 is one embodiment of a block of encrypted digital data produced according to the present invention.
Figure 3:
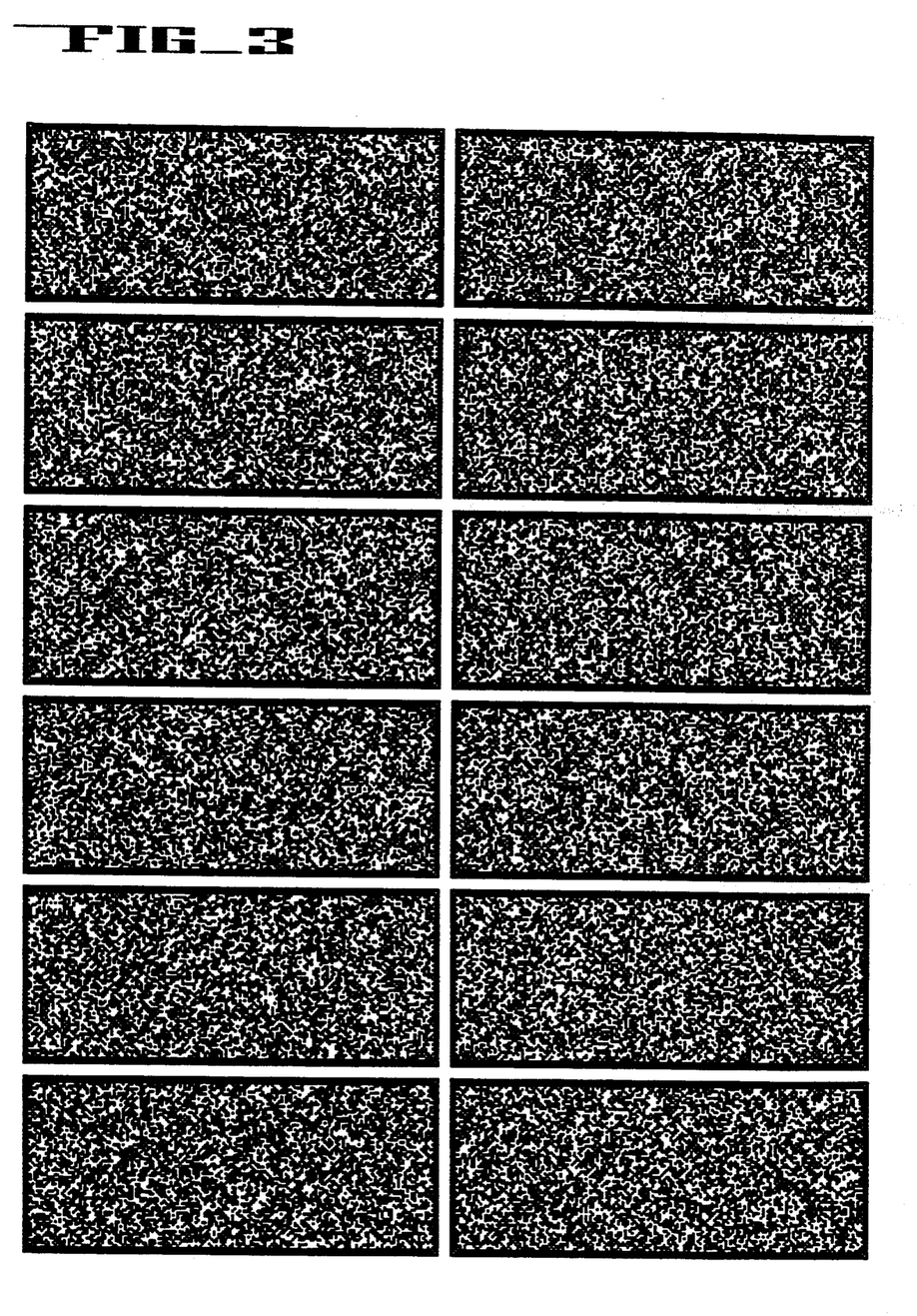
FIG. 3 illustrates a single sheet of digital paper of the present invention.

In order to write the bits on the paper, initially a stream of data to be stored on the piece of paper is stored as a block of black and white dots, or data pixels, on the paper. In one embodiment, a "1" bit can be stored as a white dot and "0" bit as a black dot. The data pixels utilized must be larger than the scanning resolution so that the scanning sample will lie within the printed pixel. In addition, a frame (or border) is placed around the block of data so that the position to read each pixel from can be accurately determined. An example of one such digital data box is shown in FIG. 2. If the data block is too large, problems with paper stretch and scanner misalignment may make reconstruction of the original data difficult.

Referring to FIG. 2, in the currently preferred embodiment, to ensure the data spacing and alignment could be determined, the black and white bits are placed in several boxes on the page. In one embodiment, twelve boxes of data are used for each 8½×11 inch sheet of paper. In one embodiment, each box has a border that is three data pixels thick and mostly black. By having a border around each box, it is easier to locate the edge of the box (when decoding). Note also that in each corner of each box, there is a large white pixel. An examination of the box also reveals alternating pixels along both the left and right edges. These are used to accurately determine the current location of a horizontal line of pixels when reading the data. Note that the alternating pattern of black and white pixels is added to the left and right edges of each box to compensate for the possible variance in the vertical spacing of the pixels. These alternating pixels are not required where the vertical spacing between the pixel rows does not vary by an amount which would cause the incorrect reading of the data (upon decoding).

Note that although twelve small boxes each storing several bytes of data is used in one embodiment, any number of boxes could be used, including only a single box. This is a design choice. A small box uses more overhead for the frame, and the space between the boxes is unused for data, but requires less correction data to be added to the encoded data (i.e., a lower error rate).

Note also that the present invention may use grayscale inks and store additional information in the gray level. In this manner, for example, eight shades of gray could be used to obtain three bits of data from a grayscale printer and scanner.

Overview of the Decoding Process of the Present Invention

Figure 4:
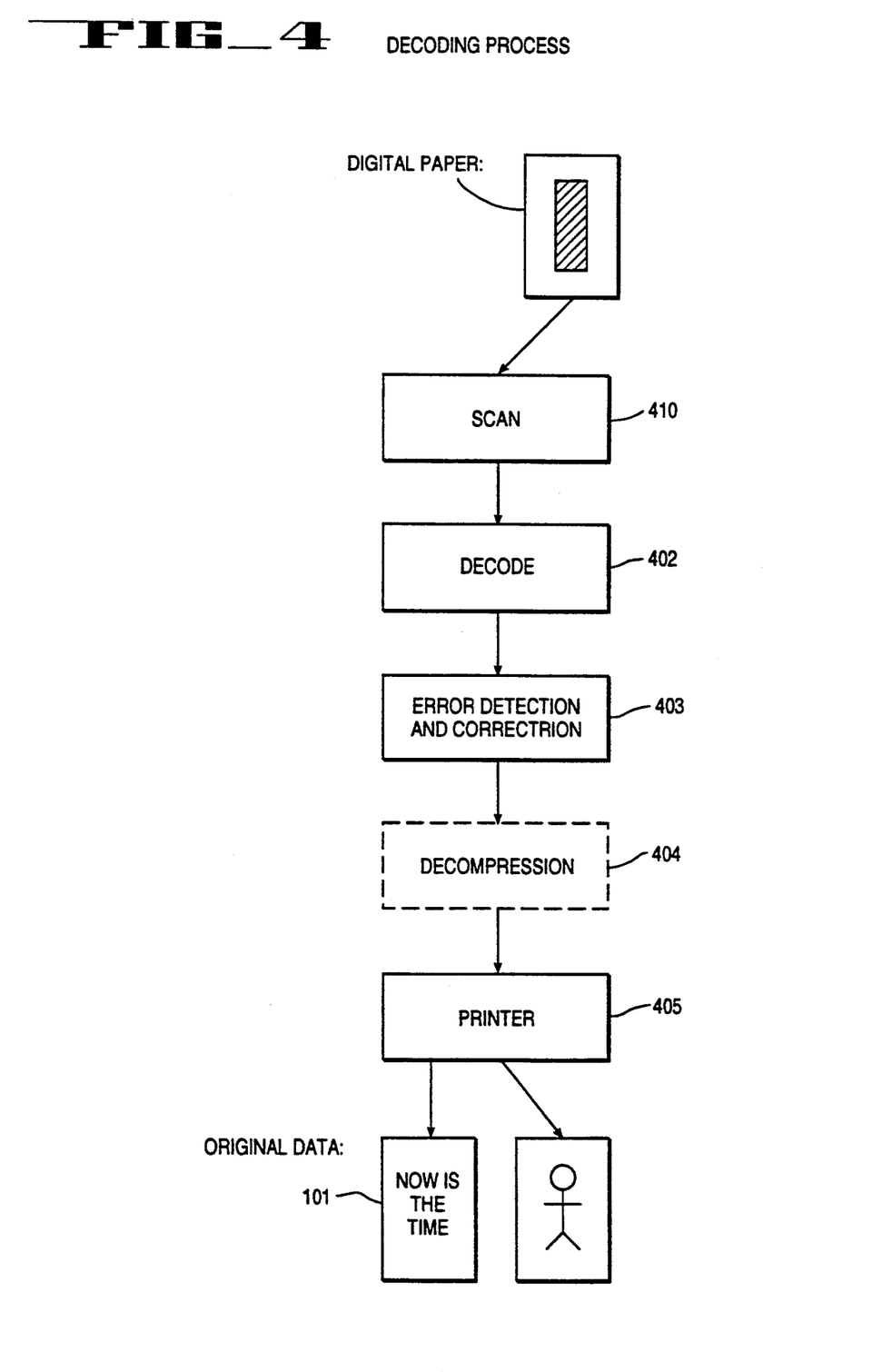
FIG. 4 is a block diagram of one embodiment of the decoding process of the present invention.

FIG. 4 illustrates the decoding process of the present invention. The decoding process of the present invention inverts the operation of the encoding process one step at a time. Initially, the sheet of digital paper is scanned (processing block 401). The scanned data is then sampled to produce a binary sequence representing the one received by the encoding process (processing block 402). Note that the result of the scan is a binary sequence which is close to the one given to the encoder. The result of the scanning may not produce an exact duplicate of the data sent to the encoder. This may be due to errors in the scanning of the data. For instance, an exact duplicate may not be sent to the decoder due to errors in the registration, flatness, skew, or scanner defects during the scanning process.

After the "digital" paper has been decoded (processing block 402), error detection and correction is performed (processing block 403). The error correction compensates for the loss of data due to damage to the paper or due to the failure to predict the pixel location correctly. The error detection and correction processing (processing block 403) is the inverse of the error correction encoding which occurred during the encoding process (FIG. 1). The error detection and correction occurs by using the parity bits added during the encoding process of FIG. 1 to correct errors which may have occurred (processing block 403). The errors may be attributed to staples, hole punches, paper discolorations, technical problems or other paper imperfections and damages.

Once any required error correction is performed, the data may undergo decompression (processing block 404). The decompression performed depends on whether compression was performed during the encoding process and is performed to restore the data, as near as possible, to its original form.

After decoding (processing block 402), error detection and correction (processing block 403) and any desired decompression (processing block 404), the reconstructed data is available and can be printed, displayed or stored on a disk. In one embodiment, the data is printed (processing block 405). In one embodiment, if the original data was a simple scan, a copy of the original can be printed. In another embodiment, if the original data was several pages of ASCII or Postscript data, the data can be printed or stored in a file. In another embodiment, if the original was a JPEG compressed color image, the image may be displayed.

One Embodiment of the Encoding/Decoding System of the Present Invention

Figure 5:
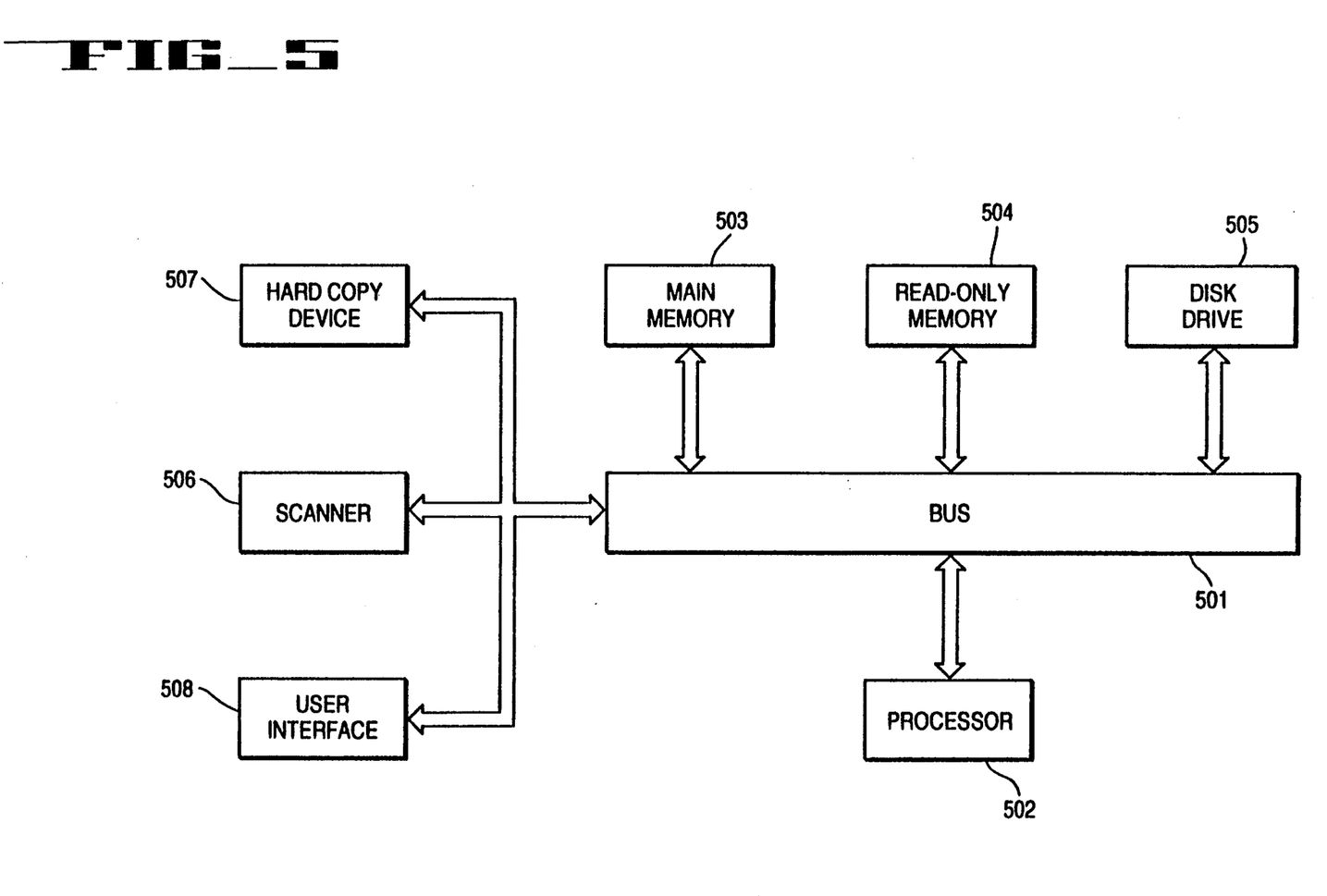
FIG. 5 is a block diagram of the digital processing system of the present invention.

FIG. 5 illustrates an overview of one embodiment of the encoding and decoding system of the present invention shown in block diagram form. The system of the present invention is a digital processing system. In the currently preferred embodiment, the digital processing system comprises a digital photocopier. In one embodiment, the operation of a digital photocopier is simulated using a scanner, printer and computer. It will be understood that while FIG. 5 is useful for providing an overall description of the processing system of the present invention, a number of details of the system are not shown. As necessary for disclosure of the present invention, further detail is set forth with other figures provided with this specification. Further, the present invention is described with reference to its preferred embodiment; alternative embodiments which may be conceived by one of ordinary skill in the art are considered within the scope of the claims set forth below.

Referring to FIG. 5, the system of the present invention includes a bus or other communication means 501 for communicating information. Processor 502 is coupled with bus 501 for processing information. A random access memory (RAM) or other dynamic storage device 503 (commonly referred to as a main memory) for storing information and instructions for processor 502 is also coupled to bus 501. Also coupled to bus 502 is a read only memory (ROM) or other static storage device 504 for storing static information and instructions for processor 102 and a data storage device 505, such as a magnetic disk and disk drive for storing information and instructions.

The processing system also includes a scanner 506 coupled to bus 501 for scanning selected hard copy documents into the processor. Scanner 506 is capable of reading digital representations of images (i.e., digital paper), as well as regular images. In order to differentiate between whether scanner 506 is reading a regular image or a piece of digital paper, some form of automation could be employed to search a portion of the document to determine that the hard copy document being scanned is a piece of digital paper. In another embodiment, a key could be entered which indicates to scanner 506 that the hard copy being scanned is a piece of digital paper.

In one embodiment, scanner 506 comprises a gray scale scanner. In the currently preferred embodiment, this resolution is 200 DPI. Scanner 506 converts the individual picture elements, referred to as pixels, of the scanned image into digital values. In one embodiment, scanner 506 comprises an Image Scanner ICS-400 brand scanner of Ricoh Corporation of West Caldwell, N.J. In other embodiments, scanner 506 is a bitmap scanner which scans the image of each hard copy input document in a predetermined spatial resolution to produce digital values. These digital values collectively produce a data structure known as a bitmap image, which is well-known to those in the art.

Note that processor 502 performs the error correction encoding, encoding, decoding, and error detection and correction processes of FIGS. 1 and 4 in conjunction with the input from scanner 506. Note also that processor 502 may also perform encryption and decryption if employed in the digital paper process. Thus, in one embodiment, processor 502 operates as the encoder and the decoder of the present invention. In one embodiment, processor 502 comprises a SPARC station 2 brand processor of Sun Microsystems, Inc. of Mountain View, Calif.

A hard copy device 507 is also coupled to bus 501 for printing hard copies for providing visual representations of the scanned originals. In one embodiment, hard copy device 507 comprises the printer portion of a photocopier. In other embodiments, hard copy device 507 could comprise a plotter or printer, such as a bitmap printer that maps the digital values of a bitmap image into pixels which are printed on the plain paper.

Moreover, a human or user interface 508 is included for enabling a user to interact with processor 502, scanner 506 and hard copy device 507. User interface 508 represents the input and output devices through which the user enters control instructions to and receives feedback from the photocopier (i.e., processor 502, scanner 506 and hard copy device 507). The feedback indicates the actions that are taken by the photocopier in response to instructions that are entered by the user. User interface 508 may be used to enter a key for encryption and decryption processes, as will be described in conjunction with FIGS. 8 and 9 below.

User interface 508 could include an alphanumeric input device including alphanumeric and other keys for communicating information and command selections, a cursor control device for controlling cursor movement and/or a display device, such as a cathode ray tube, liquid crystal display, etc. for displaying information to the photocopier user. Note that these components are well-known in the art and have been omitted to avoid unnecessarily obscuring the present invention. Note that in one embodiment, user interface 508 may provide inputs directly to scanner 506 and hard copy device 507 which can be distinct from those inputs to processor 502.

Note that, although in the currently preferred embodiment, all of these components are integrated into a single photocopier system, each of the components, such as scanner 506 and hard copy device 507, may be separate components. In one embodiment, scanner 506 and/or hard copy device 507 could be coupled to bus 502 using dedicated communication links or switchable communication networks.

Scanning Digital Paper

Figure 6:
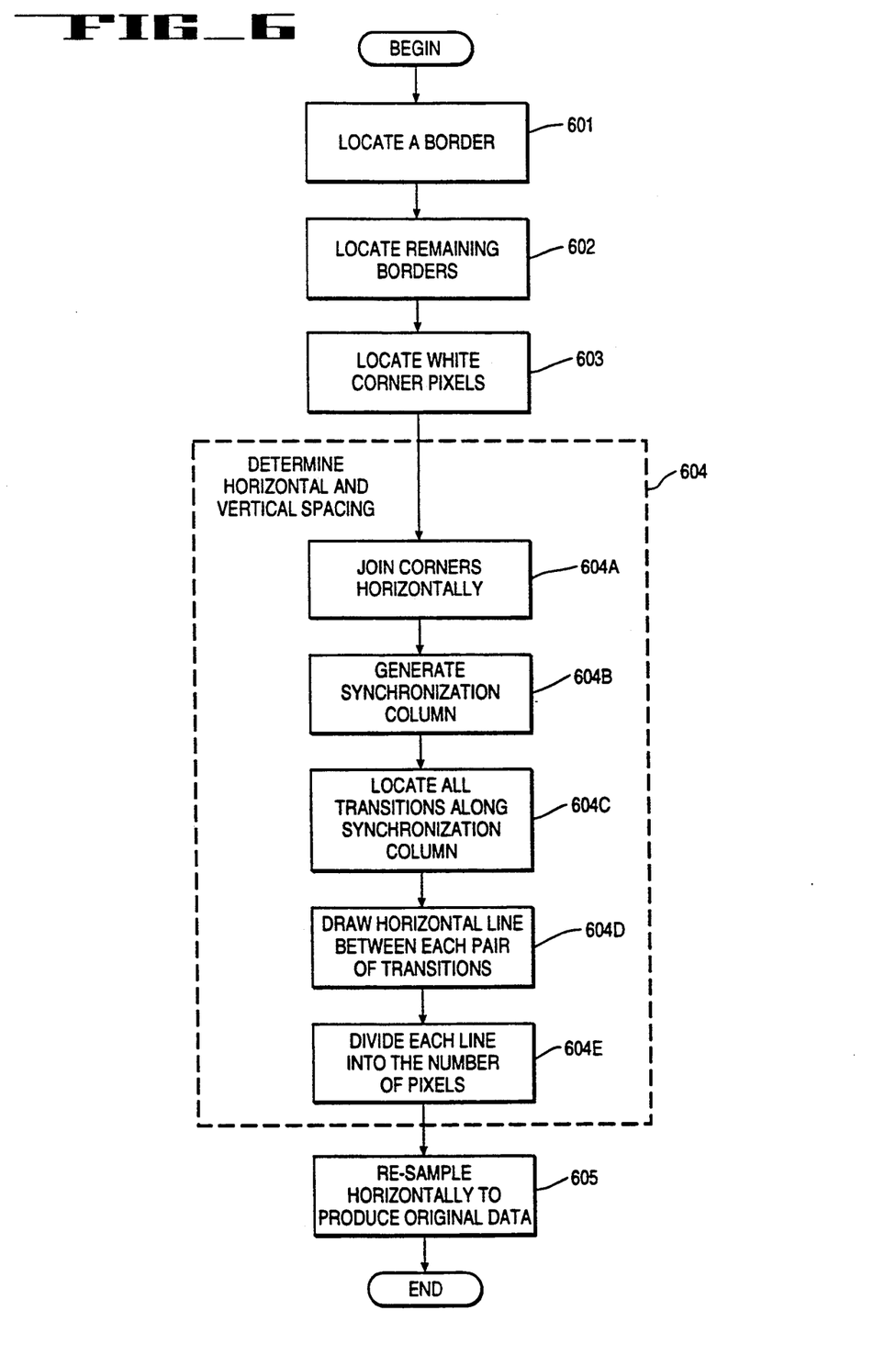
FIG. 6 is a flowchart of a decoding routine of the decoding process of the present invention.
Figure 7:
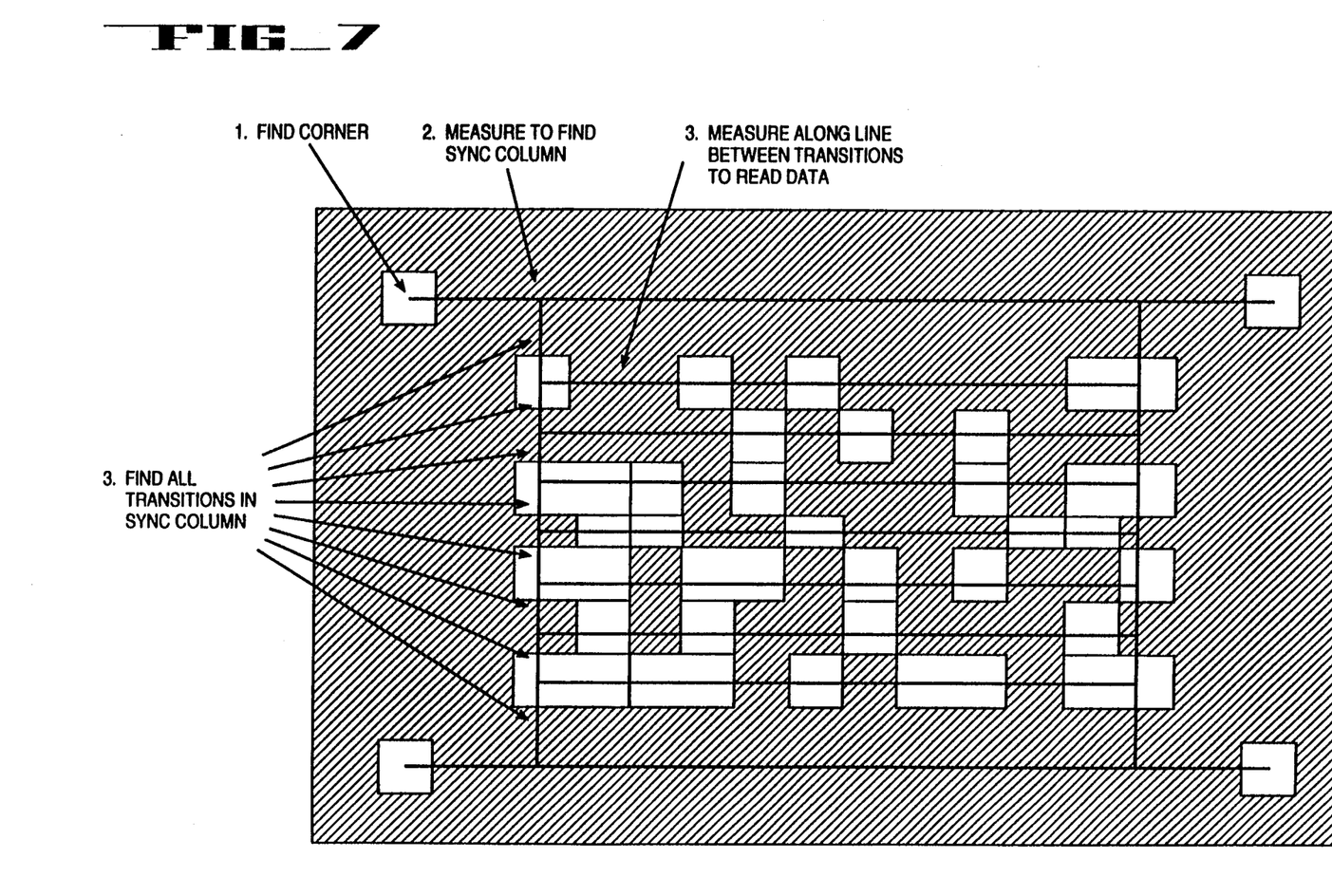
FIG. 7 illustrates one embodiment of the data box of the present invention being subjected to the decoding routine of the present invention.

In order to decode the digital paper, the entire sheet is scanned with a scanner at high resolution. In one embodiment, the entire sheet is scanned with a gray scale scanner. A software routine is used to generate a binary sequence from the scanned in data. The result produced by the software routine is a binary sequence. A flow chart of the decoding routine is shown in FIG. 6. Note that FIG. 7 illustrates a portion of the decoding process.

Referring to FIG. 6, once the digital paper is scanned in an over sampled manner, the decoding routine begins by locating the boxes on the page by searching for the black border (processing block 601). In one embodiment, the search for the black border is accomplished by scanning a row until a predetermined number of black pixels are found in a row. In the currently preferred embodiment, the borders are 3 pixels thick. The number and approximate position of the boxes on the page is assumed to be known by the decoding process (since how the digital paper is produced is known by the decoding process). However, this is not a requirement since the frame should be easy to identify even on a page full of text. Note also that in one embodiment, the size of the boxes is known to the decoding process. Therefore, once a border has been located, the other borders are located by searching the vertical and horizontal directions until the other borders of the box are located (processing block 602).

After the borders of the data blocks have been located, the four white dots are located at each corner of each box (processing block 603). In one embodiment, these white dots are located by searching the corners for the brightest pixel. Since the scanning resolution used in one embodiment is at least twice the printing resolution, each corner should have several white scanned pixels.

Because an encrypted page may be copied several times, the spacing between information pixels may change and the rows of pixels will not be perfectly aligned with the scanning row. The brightest pixel is used as the correct position to find the remainder of the data. In other words, the four white corner dots are used by the present invention to determine the horizontal spacing between the information pixels within the boxes. Once the width and height of the box (in number of data pixels) are known and the corners have been located, the horizontal and vertical spacing is determined (processing block 604).

To find the horizontal and vertical spacing when the corners have been found, the alternating pattern of black and white pixels added to the right and left edges of the box during the encoding process to compensate for the variance of the vertical spacing are examined to determine the vertical spacing between the information pixels. First, the top two corners are joined by an imaginary line (processing block 604A). The joining of the two top corners is explicitly shown in FIG. 7. A synchronization column is then approximated as a fraction of a distance between the corners (processing block 604B). The synchronization column has been shown as an imaginary line in FIG. 7. Next, the decoder finds all of the transitions in the synchronization column (processing block 604C). In one embodiment, the decoder records the location of every black-to-white or white-to-black transition. Then, starting from the point between two transitions on the left, an imaginary line can be drawn to the point between two transitions on the right (processing block 604D). Note that these lines are drawn in FIG. 7. Even though one of the rows of data is much shorter than the others and one is much taller, the correct place to read the rows can still be determined. Finally, since the number of data pixels is known, this horizontal line can be divided into the correct number of pieces and sampled at the correct location (processing block 604E).

With the vertical and horizontal spacing determined, it is possible to compute the two dimensional grids from which the data pixels can be sampled. Finally, the data box is examined horizontally and if the sample at the predicted location is closer to black than white, a 0-bit is emitted; otherwise, a 1-bit is emitted (processing block 605). In one embodiment, a bi-linear interpolation of the four pixels closest to the desired location is used to determine the value of the data. Given an interpolation of the value of the pixel at the real location, the average is compared with expected values for white or black pixels. Then if the sampled pixel is closer to white, the pixel is assumed to be a "1" data bit; otherwise, the data is assumed to be a "0" data bit. Note that other methods of interpolating and sampling may be used and are known to those skilled in the art. For example, a faster method would use the pixel closest to the desired sample point without any interpolation.

Note that encoding digital paper is similar to disk storage because binary data is mapped into space. Therefore, well-known disk storage systems, such as RLL, MFM, $M^2FM$ and others, can be used to improve encoding. Most of these methods utilize data transitions rather than data states. Data would then be encoded by the location of a change from one color to another, rather than the color itself. Another possible improvement is using the ink transitions to accurately determine the pixel spacing and data locations. The transitions thus provide not only data, but also the pixel spacing. Decoding is done with a phase lock loop algorithm.

Pixel Size and Paper Curl

In the present invention, the size of the pixel is influenced by two considerations. First, the size of the pixel is influenced by the amount of information that is to be placed onto the paper. The smaller the size pixel, the greater the amount of information which may be placed onto the paper. Second, the size of the pixel is influenced by the capability of the scanner used to scan the data from the paper when decoding. The smaller the pixel, the higher the scan rate that is required.

In one embodiment, the data pixels are printed at 50 DPI, while the scanning is performed at 200 DPI. This allows fast decoding and error correction which results in zero errors being observed in the digital data. Printing of data pixels can occur at 100 DPI and scanning at 400 DPI to increase the storage on a single sheet of paper from 15 kilobytes to 60 kilobytes.

Note that the current software uses a parameter file to set the printing and scanning resolutions and box sizes. In this manner, changes to each of these parameters may be made easily. It is possible to print at 50 DPI and scan at 200 DPI without errors. It is also possible to print at 100 DPI and scan it, 400 DPI without errors. This would allow more than 60 kilobytes of data per page to be stored. If absolutely error free operation is not required, a wide variety trade-offs between printing size, scanning size, amount of error correction, and error percentage is possible. In general, if errors are allowed, the scanning resolution can be much closer to the printing resolution and much more data can be stored on a page.

Normal scanner/photocopier covers keep paper from shifting away from the scanner lens and prevents bad lighting from occurring during the scanning process. Note that during the scanning process, scanning errors can be reduced by ensuring that the plain paper is kept flat enough to maintain accurate pixel spacing. There are numerous methods and devices which may be used to keep the paper flat and in place during scanning.

Thus, the present invention provides a method and apparatus for storing and transferring digital data on an ordinary sheet of paper, as well as retrieving the data through the use of a digital scanner. Neither the encoding nor the decoding of the data require very much processing power. The present invention allows the storage of more than 15 kilobytes of information virtually error free. The present invention also provides a method of digital transmission which allows more data to be stored on a page than text currently does. A typical page or text may have forty lines of eighty characters or 3,200 total characters. If each character truly represented eight bits of information, then one page would hold three kilobytes. Use of the present invention results in the storage of more than 15 kilobytes of data on a page. If the original text is English, it can be compressed by a factor of three and then one sheet of digital paper could be used to store the equivalent of 15 pages of text. Also, it is possible to store a normal color image on a black and white copy by storing the information digitally. Even more data could be stored with the previously mentioned disk storage codes.

Furthermore, the present invention allows for digital data to be printed and read by off-the-shelf photocopier products. In other words, the present invention does not require special laser scanners or hand-held wands to transfer digital data to and from a piece of plain paper.

Encryption

Figure 8:
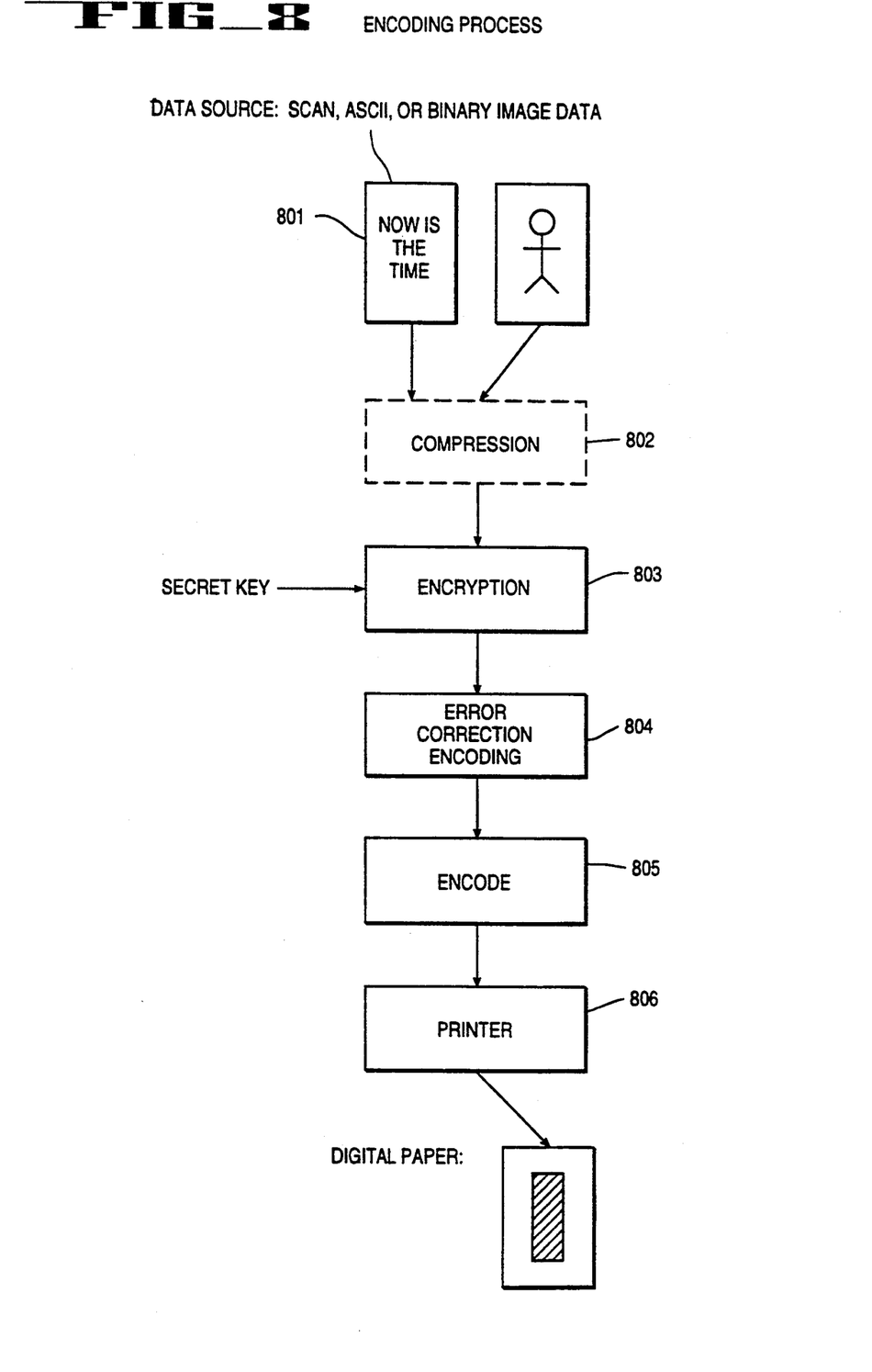
FIG. 8 is a block diagram of one embodiment of the encoding process of the present invention that includes encryption.

In one embodiment, encryption and decryption may be integrated into the encoding and decoding processes of the present invention. Note that in one embodiment of the present invention, this would occur after the compression of the digital data (processing block 102 of FIG. 1). One embodiment of the encoding process that includes encryption is shown in FIG. 8. Note that each of the processing blocks in FIG. 8 are performed as their similarly named counterparts in FIG. 1, with the exception of encryption processing block 803.

In one embodiment, the encryption is accomplished using software. In one embodiment, the software encryption is provided by exclusive-ORing the initial data with a pseudo-random sequence generated using a secret key as a seed. Note that in this case, the decryption process (as described below later)is simply exclusive-ORing the data with the same pseudo-random sequence. Note that this type of encryption process is not perfectly secure method of data encryption because of the short key length used to seed pseudo-random sequences and the fact that the same key is likely to be used on more than one message. There are well-known methods to attack this type of encryption.

In order to obtain secure data through encryption, a one time pad can be employed in place of the pseudo-random sequence. A one time pad comprises a series of randomly generated bits that are known to both parties (i.e., the "encrypting" party and the "decrypting"

party) and is only used once in the encryption process. In a one time pad, the key length is equal to the message length and may be more than 100,000 bits. Since the one time pad is used once, it is not susceptible to the same attacks which are used on pseudo-random sequences.

In another embodiment, encryption processing could be performed using the digital encryption standard (DES) or the RSA algorithm. In the RSA algorithm, digital data is encrypted using two prime numbers which are multiplied together, as is well-known in the art. In the case where each of the two prime numbers has approximately 200 digits, the RSA algorithm offers a very secure encryption method. Note that to use DES in one of the feedback modes or to use the RSA algorithm, it is necessary that errors do not occur in the encoding and decoding of the digital data stream. If an error occurs, any information beyond the location of the error would be lost. Alternatively, the encryption process can periodically be restarted so that only a portion of the message is lost if too many errors occur. It should be noted that any digital encryption method may be employed with the present invention.

Figure 9:
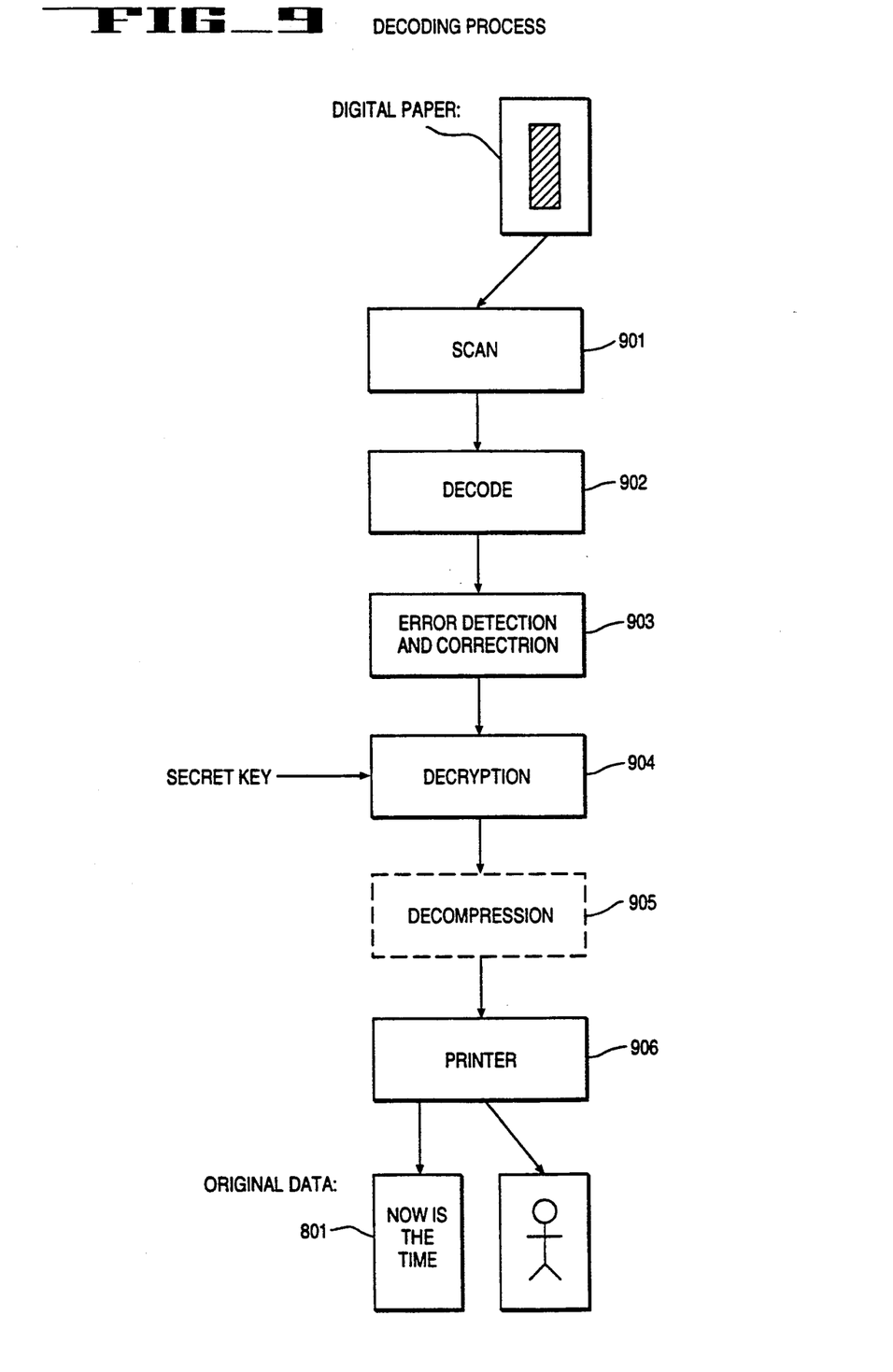
FIG. 9 is a block diagram of one embodiment of the decoding process of the present invention that includes decryption.

Similarly, if encryption is integrated into the encoding process, then decryption must be included in the decoding process. One embodiment of the decoding process of the present invention that includes decryption is shown in FIG. 9. Note that each of the processing blocks in FIG. 9 are performed in the same manner as their similarly named counterparts in FIG. 4, with the exception of decryption processing block 904.

After error detection and correction (processing block 903), the data undergoes decryption (processing block 904). The decryption processing (processing block 904)is the inverse of the encryption performed during the encoding process (FIG. 8). In one embodiment, the decryption process requires the use of the same key used during encryption. By using the same key, the original data is recreated.

When the methods of encryption (and decryption) of the present invention are being integrated into the encoding and decoding processes, the present invention also provides data information to be transferred using plain paper in a manner which preserves its privacy and/or authentication. In the present invention, this privacy can easily be obtained through the use of a key or code known to the user(s) when encryption and decryption of a document occurs. Note that the present invention provides for encryption of information using the photocopier. Using the present invention, a user could place a confidential document on a copier, press an encrypt button and enter a secret key. The copier would then scan the sheet and produce an encrypted copy. This encrypted copy could be mailed or otherwise transported to the intended receiver, who places it on a copier, presses a decryption button and enters the same secret key. The copier then produces a readable copy of the original document. The present invention also allows the encrypted copy to be treated as a normal document and be copied or stapled without greatly affecting the final decrypted document. The present invention also provides for secure encryption of a document because any person who does not know the secret key will be unable to determine the contents of the encrypted document.

Another useful application of the present invention is the authentication of a document. Specifically, the present invention could be used to authenticate signed facsimile transmissions. Through the use of digital signatures, authentication could be simple. If a photocopier allowed digital signing of a document, then digital signatures could be used for all business transactions. The authentication might consist of a small block of digital, encrypted data on an otherwise human readable document. Using the secret key, a person would be able to obtain the digital data in the small block, therein being able to verify its source. In addition, the codes could prevent forgery or provide secret information since only those using the correct key or code would be able produce the digital paper.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

Thus, a method and apparatus for placing digital information on plain paper has been described.

I claim:

1. A system for placing a data source on plain paper as digital data comprising:

formatting means for formatting the data source into a series of digital data values, wherein the series of digital data values are formatted into a plurality of contiguous rows and a plurality of contiguous columns of pixels in at least one data box, wherein each pixel represents at least one bit in the series of digital data values, and further wherein the data box includes a frame bordering the series of digital data values having alternating pixels along at least two opposite sides for identifying the vertical separations between the plurality of rows of data and having pixels in corners in the frame to determine horizontal spacing between pixels within said at least one data box; and printing means coupled to the formatting means for printing said at least one box onto at least one piece of plain paper having the plurality of rows and the plurality of columns, such that the data source is represented in digitized form on the plain paper.

2. The system as defined in claim 1 wherein the formatting means formats the data into a series of binary values.

3. The system as defined in claim 1 wherein a plurality of boxes having data values are printed on the plain paper.

4. The system as defined in claim 1 wherein a bit of data is printed on the plain paper, such that the presence of a dot on the plain paper indicates that the bit is in a first logical state and the absence of a dot on the plain paper indicates that the bit is in a second logical state.

5. The system as defined in claim 1 wherein a bit of data is printed on the plain paper, such that the change between the presence or absence of a dot on the plain paper indicates whether a bit is in a first logical state or is in a second logical state.

6. The system as defined in claim 1 wherein each pixel value printed represents three bits of data.

7. The system as defined in claim 1 further comprising compression means for compressing the data source before the formatting means formats the data.

8. A system for placing a data source on plain paper as digital data comprising:

formatting means for formatting the data source into a series of binary values, wherein the series of binary values are formatted into a plurality of contiguous rows and a plurality of contiguous columns of pixels in a plurality of data boxes, wherein each pixel represents at least one bit in the series of binary values, and further wherein each of the plurality of data boxes includes a frame bordering the series of binary values having alternating pixels along at least two opposite sides for identifying the vertical separations between the plurality of rows of data and having pixels in corners in the frame to determine horizontal spacing between pixels; and printing means coupled to the formatting means for printing said plurality of data boxes onto at least one piece of plain paper, wherein the presence of a dot on the plain paper indicates that the bit is in a first logical state and the absence of a dot on the plain paper indicates that the bit is in a second logical state, wherein the plurality of contiguous rows and a plurality of contiguous columns of pixels are printed in the plurality of rows and the plurality of columns in the plurality of data boxes, such that the data source is represented in digitized form on the plain paper.

9. The system as defined in claim 8 further comprising compression means for compressing the data source before the formatting means formats the data.

10. The system as defined in claim 8 further comprising means for error correction.

11. The system as defined in claim 8 wherein each pixel value printed represents a plurality bits of data.

12. A system for decoding plain paper having at least one data box for storing binary data values in the form of pixels, wherein said at least one data box includes a plurality of borders, said system comprising:

first locating means for locating means for locating said at least one data box on the plain paper, wherein said first locating means includes means for scanning rows of the plain paper until a predetermined number of contiguous pixels of a first color are located in a row, such that said first locating means locate one of the plurality of borders, said first locating means further comprising means for locating the other of the plurality of borders;

second locating means for locating pixels of a second color in corners of the plurality of borders of said at least one data box;

third locating means for locating the plurality of rows of pixels in each said at least one data box on the plain paper;

decoding means coupled to the first locating means, the second locating means and the third locating means for decoding each pixel in the plurality of rows into a binary data value, wherein the presence of a dot on the plain paper indicates that the bit is in a first logical state and the absence of a dot on the plain paper indicates that the bit is in a second logical state, and further wherein the decoding means locates pixels in said at least one data box based on horizontal spacing of pixels determined by the second locating means and vertical spacing of pixels determined by the third locating means, such that the plain paper is decoded.

13. The system as defined in claim 12 wherein said at least one data box includes at least two opposite edges having markers for identifying the vertical separations between the rows of data in said each of the plurality of data boxes, such that said third locating means locates each of the plurality of rows of binary data using said at least two opposite edges.

14. A method for placing digital data on plain paper comprising the steps of:

formatting the data source into a series of binary values, wherein the series of binary values are formatted into a plurality of contiguous rows and a plurality of contiguous columns of pixels in a plurality of data boxes, wherein each pixel represents at least one bit in the series of binary values, and further wherein each of the plurality of data boxes includes a frame bordering the series of binary values having alternating pixels along at least two opposite sides for identifying the vertical separations between the plurality of rows of pixels and having pixels in corners in the frame to determine horizontal spacing between pixels within said at least one data box; and printing the plurality of data boxes onto at least one piece of plain paper, wherein each of the plurality of binary values is either printed or not printed according to its logic state, such that the presence of a dot on the plain paper indicates that the bit is in a first logical state and the absence of a dot on the plain paper indicates that the bit is in a second logical state, wherein the binary values are printed in the plurality of rows and the plurality of columns in the plurality of boxes, such that the data source is represented in digitized form on the plain paper.

15. A method for decoding plain paper having at least one data box for storing binary data values in the form of pixels, said method comprising the steps of:

first locating said at least one data box on the plain paper, including the step of scanning rows of the plain paper until a predetermined number of contiguous pixels of a first color are located in a row, such that one of a plurality of borders of said at least one data box is located, and including the step of locating the other of the plurality of borders;

second location pixels of a second color in corners of the plurality of borders of said at least one data box, wherein horizontal spacing of pixels in said at least one data box is determined:

third Locating the plurality of rows of pixels in each of said at least one data box on the plain paper, wherein vertical spacing of pixels in said at least one data box is determined;

decoding each pixel in the plurality of rows into a binary data value, wherein the presence of a dot on the plain paper indicates that the bit is in a first logical state and the absence of a dot on the plain paper indicates that the bit is in a second logical state, and further wherein the pixels in said at least one data box are located based on horizontal spacing of pixels determined by the second locating step and vertical spacing of pixels determined by the third locating step, such that the plain paper is decoded.

16. A reproduction system for reproducing a data source comprising:

encryption means for performing encryption on the data source to produce encrypted data representing the data source, wherein the data source is digital and the encrypted data produced is digital;

encoding means coupled to the encryption means for encoding the encrypted data into a series of pixel values; and printing means coupled to the encoding means for printing the series of pixel values onto at least one piece of plain paper, wherein the pixel values are printed in at least one box in a plurality of contiguous rows and a plurality of contiguous columns of pixels, wherein each pixel represents at least one bit in the series of digital data values, and wherein said at least one box includes a frame bordering the series of pixels having alternating pixels along at least two opposite sides for identifying the vertical separations between the plurality of rows of data and having pixels in corners in the frame to determine horizontal spacing between pixels within said at least one data box, such that the data source represented in encrypted digitized form on the plain paper.

17. The reproduction system as defined in claim 16 further comprising scanning means for scanning the data source into digitized signals.

18. The reproduction system as defined in claim 16 further comprising means for performing error correction encoding on the encrypted data.

19. The reproduction system as defined in claim 16 wherein the encryption means uses a digital key.

20. The reproduction system as defined in claim 19 wherein the key seeds a pseudo-random sequence.

21. The reproduction system as defined in claim 19 wherein the key comprises a one-time pad.

22. The reproduction system as defined in claim 16 wherein the encryption means includes means for encrypting the data according to the digital encryption standard (DES).

23. The reproduction system as defined in claim 16 wherein the encryption means includes means for encrypting the data according to the RSA algorithm.

24. A system for representing and recognizing data on plain paper in the form of a plurality of data boxes comprising:
  encoding means for encoding the data, wherein the encoding means includes:
    encryption means for performing encryption on the data source to produce encrypted data representing the data source, wherein the data source is digital and the encrypted data produced is digital;
    encoding means coupled to the encryption means for encoding the encrypted data into a series of pixel values; and
    first output means coupled to the encoding means for outputting the series of pixel values onto at least one piece of plain paper, wherein the series of pixel values are printed in at least one box in a plurality of contiguous rows and a plurality of contiguous columns and wherein said at least one box includes a frame bordering the series of pixels having alternating pixels along at least two opposite sides for identifying the vertical separations between the plurality of rows of data and having pixels in corners in the frame to determine horizontal spacing between pixels within said at least one data box, such that the data source represented in encrypted digitized form on the plain paper; and
  recognition means for recognizing the data in the plurality of boxes, wherein the recognition means includes:
    scanning means for scanning said at least one box on the plain paper and for converting the pixels into electrical signals representative of the characters, wherein the scanning means scans rows of the plain paper until a predetermined number of contiguous pixels of a first color are located in a row, such that one of a plurality of borders of said at least one data box is located, and further wherein said scanning means locates the other of the plurality of borders, said scanning means also including means for determining the horizontal spacing and the vertical spacing of pixels in said at least one data box;
    decoding means coupled to the scanning means for decoding the electrical signals into output signals representative of the data;
    decryption means coupled to the decoding means for decrypting the electrical signals; and
    second output means coupled to the decrypting means for transferring the output signals onto a piece of plain paper.

25. The reproduction system as defined in claim 24 wherein the encryption means uses a digital key.

26. The reproduction system as defined in claim 25 wherein the key seeds a pseudo-random sequence.

27. The reproduction system as defined in claim 25 wherein the key comprises a one-time pad.

28. A process for reproducing a data source comprising the steps of:
  performing encryption on the data source to produce encrypted data representing the data source, wherein the data source is digital and the encrypted data produced is digital;
  encoding the encrypted data into a series of pixel values; and
  outputting the series of pixel values onto at least one piece of plain paper, wherein the pixel values are printed in at least one box in a plurality of contiguous rows and a plurality of contiguous columns and wherein said at least one box includes a frame bordering the series of pixels having alternating pixels along at least two opposite sides for identifying the vertical separations between the plurality of rows of data and having pixels in corners in the frame to determine horizontal spacing between pixels within said at least one data box, such that the data source represented in encrypted digitized form on the plain paper.

29. A process for decoding the data in the plurality of boxes comprising the steps of:
  scanning said at least one box on the plain paper and for converting the pixels into electrical signals representative of the characters, wherein each of the pixels; represents a binary value;
  decoding the electrical signals into output signals representative of the data, wherein the step of decoding includes the steps of:
    locating the corners of said at least one box using pixels in the corners;
    determining the spacing of the pixels according to the location of the corners of said at least one box, wherein horizontal spacing of the pixels is determined using the pixels in the corners of said at least one box;
    locating the rows of pixels in said at least one box using alternating pixels along two opposite sides of said at least one box, such that the vertical separation between the plurality of rows of data is identified; and sampling the pixels according to the horizontal spacing and the vertical separation in order to produce decoded data;

decrypting the decoded data; and transferring the output signals onto a piece of plain paper.

30. The process as defined in claim 29 wherein the step of decrypting the decoded data comprises the step of decrypting the decoded data according to a key.

31. The process as defined in claim 29 wherein the step of decrypting the decoded data comprises the step of decrypting the decoded data according to a key seeding a pseudo-random sequence.

32. The process as defined in claim 29 wherein the step of decrypting the decoded data comprises the step of decrypting the decoded data according to a key comprising a one-time pad.

33. A system for placing a data source on plain paper as digital data comprising:

a formatter, wherein the formatter formats the data source into a series of digital data values, wherein the series of digital data values are formatted into a plurality of contiguous rows and a plurality of contiguous columns of pixels in at least one data box, wherein each pixel represents at least one bit in the series of digital data values, and further wherein the data box includes a frame bordering the series of digital data values having alternating pixels along at least two opposite sides for identifying the vertical separations between the plurality of rows of data and having pixels in corners in the frame to determine horizontal spacing between pixels within said at least one data box; and a printer coupled to the formatter, wherein the printer prints said at least one box onto at least one piece of plain paper having the plurality of rows and the plurality of columns, such that the data source is represented in digitized form on the plain paper.

34. The system defined in claim 33 further comprising a data compresser coupled to receive the data source, wherein the data compresser compresses the data source and supplies the data source in a compressed form to the formatter for formatting.

35. The system defined in claim 33 further comprising an error correction encoder coupled to receive the data source, wherein the error correction encoder performs error correction encoding on the data source and supplies the data source in an error correction encoded form to the formatter for formatting.

36. A system for placing a data source on plain paper as digital data comprising:

a data compresser coupled to receive the data source, wherein the data compresser compresses the data source to produce a compressed data source;

an error correction encoder coupled to receive the compressed data source, wherein the error correction encoder performs error correction encoding on the compressed data source to produce a compressed and error correction encoded data source;

a formatter coupled to receive the compressed and error correction encoded data source, wherein the formatter formats the compressed and error correction encoded data source into a series of digital data values, wherein the series of digital data values are formatted into a plurality of contiguous rows and a plurality of contiguous columns of pixels in at least one data box, wherein each pixel represents at least one bit in the series of digital data values, and further wherein the data box includes a frame bordering the series of digital data values having alternating pixels along at least two opposite sides for identifying the vertical separations between the plurality of rows of data and having pixels in corners in the frame to determine horizontal spacing between pixels within said at least one data box; and a printer coupled to the formatter, wherein the printer prints said at least one box onto at least one piece of plain paper having the plurality of rows and the plurality of columns, such that the data source is represented in digitized form on the plain paper.

37. The system defined in claim 3 wherein at least one of the plurality of boxes contains error correction encoded data for the other of the plurality of boxes.

* * * * *